Dec. 3, 1963     R. B. WILLIAMS, JR     3,112,805
CHECKING CIRCUITS
Filed May 29, 1959     2 Sheets-Sheet 1
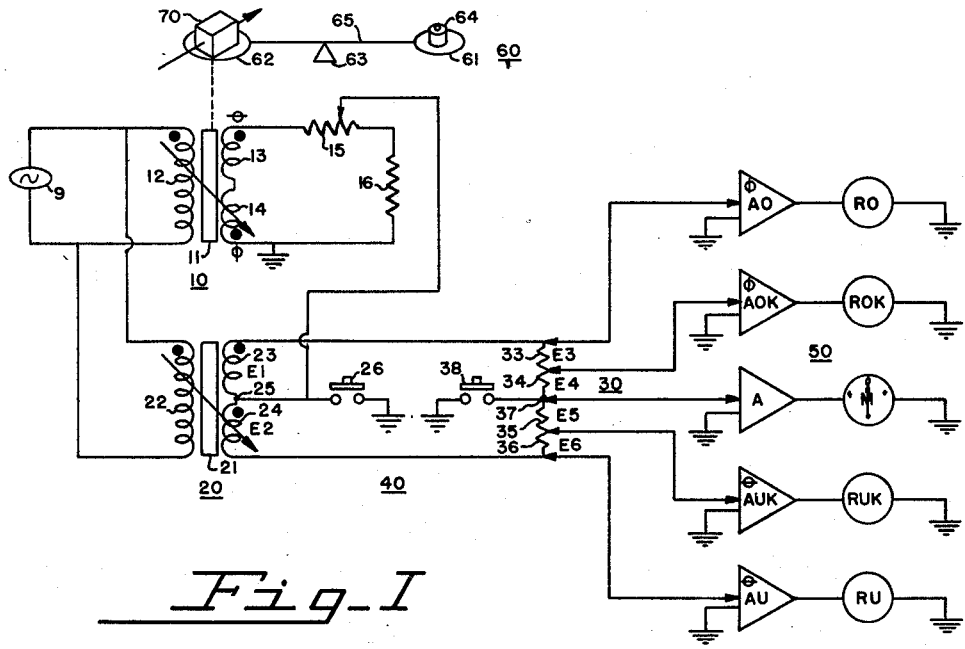
*Fig. I*
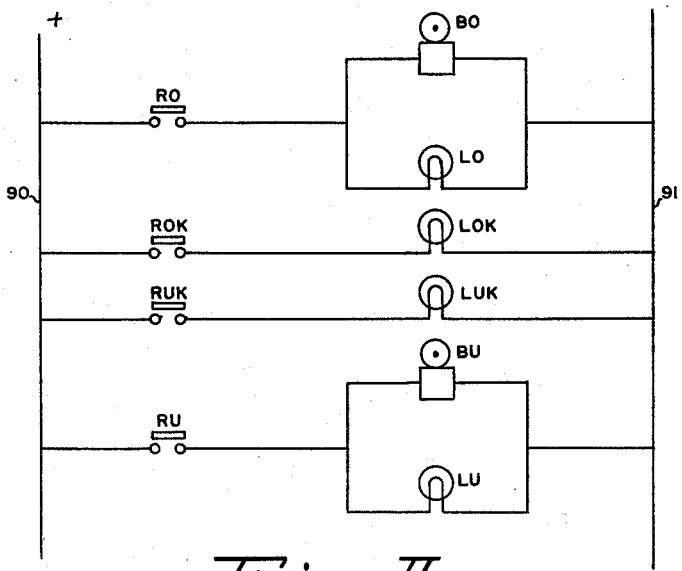
*Fig. II*
INVENTOR.
ROGER B. WILLIAMS, JR.
BY
*Marshall, Marshall & Yeasting*
ATTORNEYS Dec. 3, 1963    R. B. WILLIAMS, JR    3,112,805
CHECKING CIRCUITS
Filed May 29, 1959    2 Sheets-Sheet 2
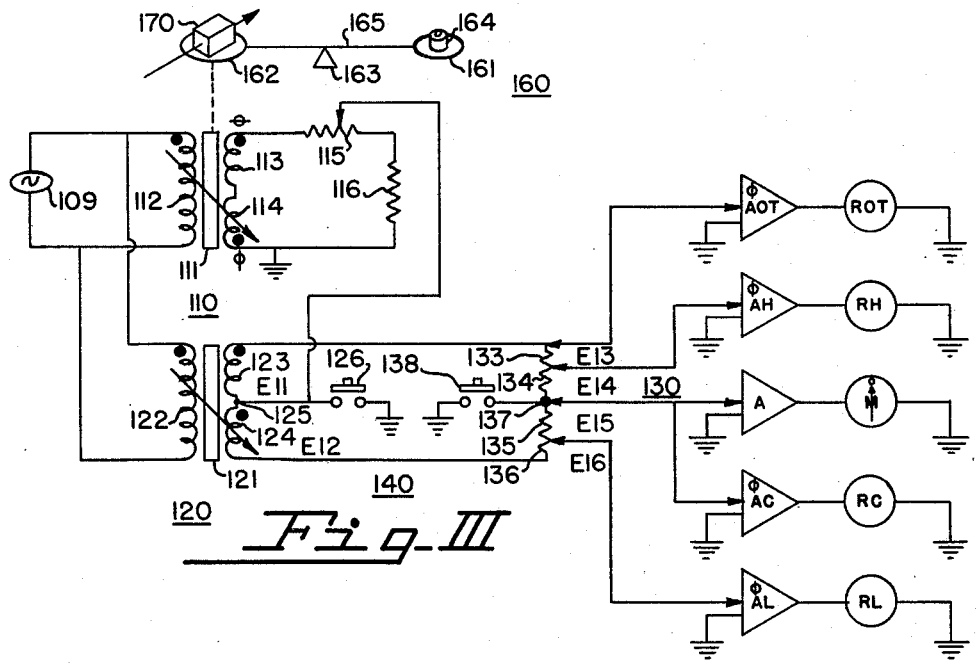
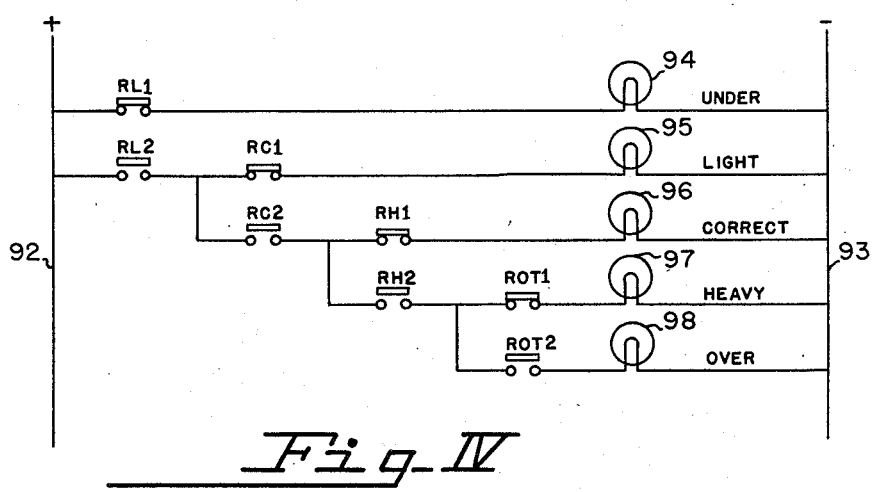
INVENTOR.
ROGER B. WILLIAMS, JR.
BY
Marshall, Marshall & Yeasting
ATTORNEYS United States Patent Office 3,112,805
Patented Dec. 3, 1963

3,112,805
CHECKING CIRCUITS
Roger B. Williams, Jr., Toledo, Ohio, assignor to Toledo
Scale Corporation, Toledo, Ohio, a corporation of
Ohio
Filed May 29, 1959, Ser. No. 816,986
6 Claims. (Cl. 177—46)

This invention relates to checking or classifying control circuits in general and in particular to classifying or checking circuits which may be used in conjunction with check-weighing operations.

There are quite a number of applications in industry where it is desired to check the weight of the contents of packaged material after the material is ready to be shipped out. In most of these applications the packages, containers, boxes, etc., contain material which has been placed therein by automated filling operations and the package has been sealed. This applies particularly in the prepackaged food industry wherein the tolerances that are allowed from the weight noted on the external side of the package are not critical. Of course, the check-weighing process may be applied where the packages are not yet sealed and may be rerouted to add or subtract from the material contained in the package. As stated above the checkweighing process is most usually utilized in applications where the contents of the package must not fall within highly critical tolerances as in batching of chemical materials which must be used later in a very critical process. Therefore it is usually only desirable to check the contents of this package against a desired weight, allow the passage of packages within the desired tolerance, and reroute the packages which are over or under tolerance for further processing.

It is accordingly an object of this invention to improve checking circuits.

It is another object of this invention to provide an improved checking circuit which may electrically classify the weight of an item that is being checked as being within one of a predetermined number of zones. These zones may comprise; overweight, but within over tolerance; over tolerance; under weight, but within tolerance; and under tolerance zones.

Further objects of this invention will become apparent when the following description is taken in conjunction with the accompanying drawings. In said drawings, for illustrative purposes only, is shown a preferred embodiment of this invention. In the drawings the manner in which the windings of the various transformers have been wound upon the associated magnetic cores has been denoted by the polarity dot convention. That is, the polarity dots on the windings indicate like instantaneous points of polarity.

In accordance with the above objects the preferred embodiment of the invention disclosed herein provides a checking circuit comprising a weight sensing device, a first differential transformer, a comparing circuit, and a plurality of output circuit means. The first differential transformer has input winding means, output winding means, and a magnetic core disposed in movable inductive relationship with said winding means. An input alternating voltage is applied to the input winding means. The output winding means provides a first phase voltage, a second phase voltage, and a null voltage in response to predetermined inductive dispositions of the magnetic core with the output winding means. One of said magnetic core and said output winding means is mechanically coupled or linked to the weight sensing device thereby assuming the predetermined inductive dispositions referred to above in response to the sensing of predetermined weights by the weight sensing device. The comparing circuit is connected in circuit relationship with the voltage of the output winding means of the first differential transformer and the input alternating voltage which is applied to the input winding means of said differential transformer thereby comparing the phases of the two voltages. The phases of the voltages referred to herein indicate a 180 degree out of phase relationship with respect to each other. Each of the plurality of output circuits are so connected to the comparing circuit means that each of the output circuit means provides at least a first and a second operative output signal condition in response to the different predetermined phases of voltage as sensed by the comparing circuit. The comparing circuit means comprises a second transformer having a primary winding and a center-tapped secondary winding, and a voltage dividing network. The primary winding of the second transformer, which may also be a differential transformer for adjustment purposes, is also connected to the alternating voltage which is applied to the input winding of the first differential transformer. The voltage dividing network is connected in series circuit relationship with the center-tapped secondary winding and provides for the plurality of output circuit means a like plurality of reference voltages. The voltage of the output winding means of the first differential transformer is connected in predetermined circuit relationships with the plurality of reference voltages of the voltage dividing network through the center tap of said second transformer to the plurality of output circuit means. This embodiment of this invention is illustrated in the following figures.

FIGS. I and III are schematic diagrams of first and second checking circuits illustrating the teachings of this invention; and FIGS. II and IV are schematic diagrams of indicating circuits which may be used with the apparatus shown in FIGS. I and III respectively.

Referring to FIG. I the checking circuit comprises in general a differential transformer 10, a second transformer 20, a comparing circuit 40 and a plurality of output devices 50. The differential transformer 10 comprises a magnetic core 11 having inductively disposed thereon an input winding 12 and a pair of output winding means 13 and 14. As may be seen from the polarity dots, the windings 13 and 14 are connected in series opposition. An alternating voltage 9 is connected to the input winding 12. A potentiometer 15 and a current limiting resistor 16 are connected in series with the output winding means 13, 14.

A weight sensing device is shown generally at 60, comprising balance pans 61 and 62 connected to a lever 65 balanced across a fulcrum 63. A reference weight 64 is to be placed on the pan 61. A package 70, which is the item to be weighed, is placed on the pan 62. The pan 62 is coupled to the movable magnetic core 11 of the differential transformer 10. Therefore, the weight of the item 70 will determine how the magnetic core 11 is inductively disposed with respect to the output windings 13 and 14 which are to remain in a fixed position. It will be realized that the weight sensing device shown generally at 60 is only a symbolic representation of the many weight sensing devices that may be utilized in conjunction with this invention. For example, if the invention were being utilized in an automated food packaging line then the items 70 as they were being weighed would be moved across the pan 62 by a conveyor. This, of course, means the utilization of various limit switches, photosensitive devices, or other means to determine when one of the items 70 is over the pan 62 and in a position to have its weight measured. The pan 62 would then, of course, need a damping mechanism to hold its relative position while the item 70 is being placed thereon. The limit switch or switches could be utilized to disconnect the checking circuit of this invention to avoid false readings or indications prior to the actual weighing process of the item 70. The various types of weighing devices and their associated paraphernalia which may be utilized in conjunction with the apparatus in FIG. I is beyond the realm of this invention or disclosure. It is sufficient to note that there are a number of weighing devices which may be utilized to mechanically or otherwise dispose the magnetic core 11 of the differential transformer 10 in a number of predetermined inductive relationships with the output windings 13 and 14 to produce the desired phases of voltage therefrom. It is also to be noted that while the embodiment of FIG. I shows the input and output winding means of the differential transformer 10 in a fixed position and the core 11 as movable, that other embodiments may be utilized in which the core is fixed and the windings are movable, or in which both are movable with respect to each other, all in response to selected weights on the weight sensing device 60.

The comparing circuit 40 includes a second transformer 20 and a voltage dividing network 30. The second transformer 20 comprises a primary winding 22 and a center-tapped secondary winding means 23, 24 inductively disposed with respect to a magnetic core 21. The winding means 23, 24 are connected, as indicated by the polarity dots, in a series-aiding connection. The center-tapped secondary winding means 23, 24 is connected in series with a voltage dividing network 30. The voltage of the network 30 comprises the resistors 33, 34, 35 and 36 connected in series.

The plurality of output devices 50 comprises the phase sensitive amplifiers AO, AOK, AUK and AU and their respective associated relays or switching means RO, ROK, RUK and RU. There are a number of phase sensitive amplifiers commercially available which are well known to those skilled in the art. The phase sensitive amplifier as utilized in this first embodiment amplifies only a signal of a predetermined phase which is presented to its input. That is if the amplifier were sensitive to a first or phi ($\phi$) phase of an alternating current input voltage it would produce an output if the phi ($\phi$) phase were applied to its input. If, however, a signal of a second or theta ($\theta$) phase or no signal at all were applied to its input then there would be no output from the phase sensitive amplifier. The two phases referred to herein are spaced substantially 180° electrical degrees apart on a single time axis. The output of the amplifiers AO, AOK, AUK and AU are connected to energize the switching means which are shown as the relays RO, ROK, RUK and RU.

The voltages appearing on the windings 23, 24 and the resistances 33, 34, 35, and 36 are designated as the voltages respectively E1, E2, E3, E4, E5 and E6. The voltage that is taken from the movable tap of the potentiometer 15 from the output windings 13, 14 of the differential transformer 10 will be designated as X. The magnetic core 11 is adjusted inductively disposed with respect to the windings 13, 14 so that when there is an item of the desired weight on the pan 62 there is a null output voltage on the windings 13, 14. In this case X would be equal to zero. If an item 70 is placed on the pan 62 that is overweight the core 11 will we displaced in the downward direction thereby causing a voltage of a first or phi ($\phi$) phase to appear on the potentiometer 15. This X ($\phi$) voltage will be applied from the potentiometer 15 to the center tap 25 of the second transformer 20 and will be compared or added with the voltage E1 of the winding 23 and voltages E3 and E4 of the resistances 33 and 34. It can thus be seen that the comparing circuit 40 compares the voltage X as received from the differential transformer 10 output with the reference voltages of the comparing circuit 40 by adding them in series through the center tap 25 of the winding means 23, 24 to the inputs of the respective amplifiers. The vector relationships of the voltages to the inputs of the respective output circuits for the instantaneous voltages as shown are as follows:

| Output Circuit | Instantaneous Voltage |
| --- | --- |
| AO | X+E1 |
|  | X−E2+E6+E5+E4+E3 |
| AOK | X+E1−E3 |
|  | X−E2+E6+E5+E4 |
| A | X+E1−E3−E4 |
|  | X−E2+E6+E5 |
| AUK | X+E1−E3−E4−E5 |
|  | X−E2+E6 |
| AU | X+E1−E3−E4−E5 |
|  | X−E2 |

Thus the inputs to the respective amplifiers becomes a matter of simply vector addition of voltages. Since the output voltage X from the winding means 13, 14 is assumed to be zero with the desired ideal weight on the pan 62 then the reference voltages may be considered as the steady state input voltages to the respective amplifiers. For example, the input, with the desired weight on the pan 62, to the amplifier AO would be the voltage E1 with polarity as shown. Since we have designated the voltage from the winding 14 as the phi ($\phi$) phase and the voltage from the winding 13 as the theta ($\theta$) phase, then the voltage available from the top lead of the center-tapped secondary winding means 23 must be of the theta ($\theta$) phase and the voltage from the bottom lead must be of the phi ($\phi$) phase. This enables the use of phi ($\phi$) phase amplifiers for the AO and AOK amplifiers and theta ($\theta$) phase sensitive amplifiers for the AUK and AU amplifiers as will be explained hereinafter.

Referring again to the ideal weight condition of the pan 62 it may be seen that the only input signal applied to the phi ($\phi$) sensitive amplifier AO is the theta ($\theta$) reference voltage available from the winding 23. Therefore, the amplifier AO stays cut off until the magnetic core 11 is depressed downwardly by a weight on the pan 62 until a phi ($\phi$) phase voltage is made available which is larger than the theta ($\theta$) phase voltage already applied to the input of the amplifier AO. The presence of this magnitude of phi ($\phi$) phase voltage enables the amplifier AO to turn on and energize the switching means RO, denoting that an item 70 is overweight and over tolerance.

The amplifier AOK is similarly connected with the exception that the voltage E3 appearing on the resistor 33 is of the phi ($\phi$) phase and is already subtracting from the theta ($\theta$) phase voltage E1 thus not requiring as large a phi ($\phi$) phase output from the differential transformer 10 to turn on the amplifier AOK and allowing it to energize its switching means ROK. Therefore the energization of switching means ROK indicates that an item 70 is overweight but within tolerance.

The amplifiers AU and AUK are similarly operative by connection through the voltage E2 and the voltages E2 plus E6, respectively, to the X output voltage from the differential transformer 10. However, as noted above, the amplifiers AU and AUK have theta ($\theta$) sensitive inputs and thus are connected to the lower lead on the bottom half of the center-tap secondary 23, 24. In order to turn the amplifiers AU and AUK on and allow them to energize their respective output switching means RU and RUK it is necessary for the magnetic core 11 to be displaced in an upward direction with respect to the output winding means 13, 14 of the differential transformer 10. This occurs, of course, when an item 70 is under weight. If the item 70 is under weight more than the predetermined tolerance the amplifier AU will energize the switching means RU. If the item 70 is under weight, but still within tolerance, the amplifier AUK will be turned on and its output switching means RUK will be energized. AOK and AUK are also energized with AO and AU, respectively.

The embodiment of the invention as illustrated in FIG. I shows each of the output circuit means as having its amplifier turned off or not producing an output and the switching means deenergized when there is an ideal weight being weighed by the weight sensing device 60. This could be termed a first operative output signal condition. A second operative output signal condition would arise when the amplifier is producing an output and the switching means is energized in response to a nonbalancing weight on the weight sensing device 60. This is not meant to exclude other output signal conditions or other use of the present output signal conditions as would fall within the spirit and scope of this invention.

An additional feature of the invention is that the circuit hereinbefore described may also be utilized to indicate visually the amount that an item 70 that is being checkweighed is off weight. This is accomplished by connecting an amplifier A to a center tap 37 of the voltage dividing network 30. The amplifier A may be any one of a number known to those skilled in the art which takes an alternating current input, amplifies it, and provides a direct current output which is reversible in response to a change of phase of the alternating current input. A meter M is connected to the output of the amplifier A and has a zero indicating position and is operative to deflect in either of two directions in response to the reversible direct current output from the amplifier A. The amplifier A and the meter M may also be utilized to balance the checkweighing circuit to zero as will be explained hereinafter.

Assuming a no load position of the core 11, that is, a null voltage output from the potentiometer 15, then the center-tapped transformer 23, 24 provides a voltage drop across the voltage dividing network 30. If the terminal 37 is a center tap of the voltage dividing network 30 the voltages E3 plus E4 must equal the voltages E5 plus E6. Also the voltages E1 and E2 on the center-tapped transformer 23, 24 are equal. Thus it can be seen that the addition of a zero voltage from the potentiometer 15 through the center tap 25 to the center tap 37, in either of the parallel paths, will still produce a zero output to the amplifier A. Since there is a zero signal to the amplifier A the meter M will so indicate by pointing a hand to the zero calibration point on the dial of the meter M. As was discussed hereinbefore, the development of a theta ($\theta$) or phi ($\phi$) phase voltage from the potentiometer 15 in response to the displacement of the magnetic core 11 from the null position, will upset the zero balance of the center-tap winding means 23, 24 and the voltage dividing network 30. Downward deflection of the core 11 will produce a phi ($\phi$) phase voltage from the potentiometer 15 which will be detected by the amplifier A and deflect the meter hand in a first predetermined direction. The movement upward of the core 11 will provide a theta ($\theta$) phase voltage output from the potentiometer 15 which will, by the vector addition of the various voltages as discussed hereinbefore, produce a theta ($\theta$) phase voltage at the terminal 37 which will cause the amplifier A to produce a direct current output of the opposite polarity thereby deflecting the indicating hand of the meter M in a second predetermined direction opposite that of the meter M response to the phi ($\phi$) phase voltage.

Additional features of this invention include the provision of a switch 38 connecting the center tap 37 of the voltage dividing network 30 to ground. The closing of the switch 38 insures that a zero signal is being impressed upon the input of the amplifier A. Therefore the meter M may be calibrated to an exact zero indication on the dial. In addition there is provided a connection through the switch 26 from the center tap 25 to ground. This allows the adjustment of the transformer 20, if it is a differential transformer, by movement of the core 21 to insure that the voltages E1 and E2 are equal. Since the meter M has already been set to a true zero with respect to ground the switch 38 may be opened. The switch 26 is now closed but if the voltages E1 and E2 are not equal there will be an indication on the meter M by deflection of the hand from the zero indication and the core 21 may be moved in the proper direction to bring the voltages E1 and E2 into equality. This adjustment can be made very accurately since a very sensitive meter M may be utilized and calibrated accordingly.

It is to be noted that the combination of the weight sensing device 60 and the responsive core 11 of the differential transformer 10 is a preferred embodiment of a condition responsive means that produces a first phase, a second phase and a null voltage output in response to a condition being measured. However, there are other condition responsive means and circuit means which will produce this result, for example, a potentiometer having a positive terminal of a first voltage source connected to one end of said potentiometer while a negative terminal of a second voltage source is connected to the opposite end of the potentiometer and the remaining voltage terminals are connected to a center tap. If the center tap of the potentiometer is grounded then the movement of an adjustable tap of the potentiometer, in response to a weight or other condition being measured, along the length of the potentiometer will provide a first phase, a null, and a second phase voltage with respect to ground.

Referring to FIG. II there is shown an indicating circuit which may be utilized in conjunction with the apparatus of FIG. I. Contacts RO, ROK, RUK and RU of the relays RO, ROK, RUK and RU of FIG. I are each connected serially with respective indicating means which may be visual, audible or other indicating means as desired. These various indicating circuits are connected between direct current supply leads 90 and 91. Since the over OK and under OK tolerance zones would not be as critical as the over tolerance and under tolerance zones, it would probably be preferred to include only visual indicating means such as the lamps LOK and LUK respectively serially connected therewith. However, since the over tolerance and under tolerance zones would be more critical and might require more attention from an operator, audible or buzzer means BO and BU have been connected in parallel with the visual or lamp indicating means LO and LU, said parallel circuit being serially connected with the respective contacts RO and RU of the over tolerance and under tolerance relays RO and RU. Various other configurations of indicating circuits utilizing the switching means RO and RU that are known to those skilled in the art may be utilized.

It is to be noted that the outputs from the various relays may be utilized to operate other control circuits which might be provided to further process an under tolerance and over tolerance item. For example, if a conveyor has been used to convey the items 70 across the scale 30 the outputs of the output relays might be utilized to energize a conveyor switching control circuit which would switch the items 70 onto side spurs of over tolerance items and under tolerance items or channel the items 70 straight ahead on a within tolerance conveyor.

The outputs of the output relays may also be utilized to energize zone counters which count the number of items that fall within each zone and gives the indication at the end of a work period or intermediate the end of a work period of how many items are falling into each zone. This information could be utilized to alter the processing of the items 70 before they reach the checkweighing station.

Referring to FIG. III there is illustrated a second embodiment of the teachings of this invention which is similar to the apparatus of FIG. I but which operates in a slightly different manner. In FIG. III the checking circuit comprises in general a differential transformer 110, a second transformer 120, a comparing circuit 140 and a plurality of output devices 150. The differential transformer 110 comprises a magnetic core 111 having inductively disposed thereon an input winding 112 and a pair of output winding means 113 and 114. As may be seen from the polarity dots, the windings 113 and 114 are connected in series opposition. An alternating voltage 109 is connected to the input winding 112. A potentiometer 115 and a current limiting resistor 116 are connected in series with the output winding means 113, 114.

A weight sensing device is shown generally at 160, comprising balance pans 161 and 162 connected to a lever 165 balanced across a fulcrum 163. A reference weight 164 is to be placed on the pan 161. A package 170, which is the item to be weighed, is placed on the pan 162. The pan 162 is coupled to the movable magnetic core 111 of the differential transformer 110. Therefore, the weight of the item 170 will determine how the magnetic core 111 is inductively disposed with respect to the output winding means 113 and 114 which are to remain in a fixed position. Again, it will be realized that the weight sensing device shown generally at 160 is only a symbolic representation of the many weight sensing devices that may be utilized in conjunction with this invention. Hereinbefore, if the invention were being utilized in an automated food packaging line then the items 170 as they were being weighed would be moved across the pan 162 by a conveyor. This, of course, means the utilization of various limit switches, photosensitive devices, or other means to determine when one of the items 170 is over the pan 162 and in a position to have its weight measured. The pan 162 would then, of course, need a damping mechanism to stabilize the weighing mechanism 160 while the item 170 is being placed thereon. The limit switch or switches discussed above could be utilized to disconnect the checking circuit of this embodiment to avoid false readings or indications prior to the actual weighing process of the item 170. Again it is to be noted that there are a number of weighing devices which may be utilized to mechanically or otherwise dispose the magnetic core 111 of the differential transformer 110 in a number of predetermined inductive relationships with the output windings 113 and 114 to produce the desired phases of voltage therefrom. Also, while the embodiment of FIG. III shows the input and output winding means of the differential transformer 110 in a fixed position and the core 111 as movable, other embodiments may be utilized in which the core is fixed and the windings are movable, or in which both are movable with respect to each other, all in response to selected weights on the weight sensing device 160.

The comparing circuit 140 includes a second transformer 120 and a voltage dividing network 130. The second transformer 120 comprises a primary winding 122 and a center-tapped secondary winding means 123, 124 inductively disposed with respect to a magnetic core 121. The winding means 123, 124, are connected as indicated by the polarity dots, in a series-aiding connection. The center-tapped secondary winding means 123, 124 is connected in series with a voltage dividing network 130.

The voltage of the network 130 comprises the resistors 133, 134, 135, and 136 connected in series.

The plurality of output devices 150 comprises the phase sensitive amplifiers AL, AC, AH and AOT and their respective associated relays or switching means RL, RC, RH and ROT. These phase sensitive amplifiers are of the type that will maintain the relays RL, RC, RH and ROT energized when a signal of a predetermined phase is presented to its input. A null or zero input to the amplifiers will also allow an output. That is, if the amplifier were sensitive to a first or phi ($\phi$) phase of an alternating current input voltage it would produce an output if the phi ($\phi$) phase were applied to its input or if there was no signal applied to the input. If, however, a signal of a second or theta ($\theta$) phase were applied to its input then there would be no output from the phase sensitive amplifier. The two phases referred to herein are spaced substantially 180° electrical degrees apart on a single time axis. The output of the amplifiers AL, AC, AH and AOT are connected to energize the switching means which are shown as the relays RL, RC, RH and ROT.

The voltages appearing on the windings 123, 124 and the resistances 133, 134, 135, and 136 are designated as the voltages respectively E11, E12, E13, E14, E15 and E16. The voltage that is taken from the movable tap of the potentiometer 115 from the output windings 113, 114 of the differential transformer 110 will be designated as Z. The magnetic core 111 is adjusted to be inductively disposed with respect to the windings 113, 114 so that when exactly the desired weight is on the pan 162 there is a null output voltage on the windings 113, 114. In this case Z would be equal to zero. If an item 170 is placed on the pan 162 that is overweight the core 111 will be displaced in the downward direction thereby causing a voltage of a first or phi ($\phi$) phase to appear on the potentiometer 15. This Z ($\phi$) will be applied from the potentiometer 115 to the center tap 125 of the second transformer 120 and will be compared or added with the voltage E11 of the winding 123 and voltages E13 and E14 of the resistances 133 and 134. It can thus be seen that the comparing circuit 140 compares the voltage Z as received from the differential transformer 110 output with the reference voltages of the comparing circuit 140 by adding them in series through the center tap 125 of the winding means 123, 124 to the inputs of the respective amplifiers. Thus the inputs to the respective amplifiers becomes a matter of simply vector addition of voltages.

Since the output voltage Z from the winding means 113, 114 is assumed to be zero with the ideal desired weight on the pan 162 then the reference voltages may be considered as the steady state input voltages to the respective amplifiers. For example, the input, with the desired weight on the pan 162, to the amplifier AOT would be the voltage E11 with polarity as shown. Since we have designated the voltage from the winding 114 as the phi ($\phi$) phase and the voltage from the winding 113 the theta ($\theta$) phase, then the voltage available from the top lead of the center-tapped secondary winding means 123 must be of the theta ($\theta$) phase and the voltage from the bottom lead must be of the phi ($\phi$) phase. This enables the use of phi ($\phi$) phase sensitive amplifiers for all of the amplifiers in this embodiment as will be explained hereinafter.

Referring again to the ideal weight condition of the pan 162 it may be seen that the only input signal applied to the phi ($\phi$) sensitive amplifier AOT is the theta ($\theta$) reference voltage available from the winding 123. Therefore, the amplifier AOT stays cut off until the magnetic core 111 is depressed downwardly by a weight on the pan 162 until a phi ($\phi$) phase voltage is made available which is larger than the theta ($\theta$) phase voltage already applied to the input of the amplifier AOT. The presence of this magnitude of phi ($\phi$) phase voltage enables the amplifier AOT to turn on and energize the switching means ROT, denoting that an item 170 is overweight and over tolerance.

The amplifier AH is similarly connected with the exception that the voltage E13 appearing on the resistor 133 is of the phi ($\phi$) phase and is already subtracting from the theta ($\theta$) phase voltage E11 thus not requiring as large a phi ($\phi$) phase output from the differential transformer 110 to turn on the amplifier AH and allowing it to energize its switching means RH. Therefore the energization of switching means RH indicates that an item is overweight and heavy but within tolerance.

The amplifiers AL and AC are similarly operative by connection through the voltages E12 plus E16 and the voltages E12 plus E16 and E15, respectively, to the Z output voltage from the differential transformer 110. If the item 170 is of the correct weight then the amplifier AC will energize the switching means RC. If the item 170 is under weight or light, the amplifier AL will be turned on and its output switching means RL will be energized.

The embodiments of the invention as illustrated in FIG. III shows each of the output circuit means as having its amplifier turned "off" or not producing an output and its respective switching means deenergized when there is no weighing being done by the weight sensing device 60. As weight is added to the pan 162 the relay RL will energize first, the relay RC second, the relay RH third, and the relay ROT fourth. Each of the previously energized relays stay energized when a successive relay is energized. Again, the particular operative output signal conditions illustrated in FIG. III are not meant to exclude other output signal conditions or other use of the present output signal conditions as would fall within the spirit and scope of this invention.

Referring to FIG. IV there is illustrated a schematic diagram of an indicating circuit which may be used in conjunction with the apparatus shown in FIG. III. Each of the output relays RL, RC, RH, and ROT of the apparatus of FIG. III may be equipped with front and back contacts. These front and back contacts of the respective relays are utilized in one preferred form of a contact matrix to light indicating lamps for the various zones and to provide, if desired, output signals which may be utilized by counters which will count the number of items that fall within a particular zone.

The contacts matrix of FIG. IV comprises the following connections. A back contact RL1 of the relay RL is connected in series with an indicating lamp 94 between supply leads 92 and 93. A front contact RL2 of the relay RL and a back contact RC1 of the relay RC are connected in series with an indicating lamp 95 between the supply leads 92 and 93. A front contact RC2 of the relay RC and a back contact RH1 of the relay RH are connected in series with a lamp 96 between the supply lead 93 and the junction of the front contact RL2 and the back contact RC1. A front contact RH2 of the relay RH and a back contact ROT1 of the relay ROT are connected in series with a lamp 97 between the supply lead 93 and the junction of the front contact RC2 and the back contact RH1. A front contact ROT2 of the relay ROT and a lamp 98 are connected in series between the supply lead 93 and the junction of the front contact RH2 and the back contact ROT1. It is to be noted that there are other configurations of contact matrices which would give desired output signal conditions but it is believed that the relay matrix illustrated in FIG. IV make the most economical use of the relay contacts and associated circuitry.

When making use of the designation "front contacts" and "back contacts" it is meant that the back contacts are normally closed and that the front contacts are normally open and that the normal state of the relay is deenergized.

In operation it is to be remembered that the relays RL, RC, RH and ROT are successively energized as more weight is placed on the weighing mechanism 160 and that the previously energized relays stay energized as successive relays are energized. In FIG. IV, with none of the relays energized, the contacts RL1 are closed illuminating the "under" indicating lamp 94. As a weight is placed on the scale that is sufficient to energize the relay RL the back contacts RL1 open extinguishing the "under tolerance" lamp 94. However, the front contacts RL2 close and complete a circuit through the back contacts RC1 to illuminate the "light, but acceptable" indicating lamp 95. As more weight is placed on the scale that brings the total weight to the correct desired weight the relay RC is energized. This opens back contacts RC1 and extinguishes the lamp 95. However, the front contacts RS2 are now closed and complete a circuit through the previously closed front contacts RL2 and the already closed back contacts RH1 to illuminate the "correct weight" indicating lamp 96. If still more weight is placed on the weighing mechanism 160 the relay RH is energized. This opens the back contacts RH1 and extinguishes the lamp 96. However, the front contacts RH2 are now closed and complete a circuit through the previously closed front contacts RC2 and RL2 through the already closed back contacts ROT1 to illuminate a "heavy, but acceptable" indicating lamp 97. As yet more wieght is added to the weighing mechanism 160 which is over tolerance the relay ROT is energized. This opens back contacts ROT1 and extinguishes the lamp 97. However, the front contacts ROT2 are now closed to complete a circuit through the previously closed front contacts RH2, RC2 and RL2 illuminating the "over tolerance" lamp 98. Thus it can be seen that when weights of various magnitudes are being checked on the checking circuit of FIG. III that the relay matrix of FIG. IV will indicate whether the weight on the scale is the correct weight, light or heavy, or under or over a predetermined tolerance.

In conclusion it is pointed out that while the illustrated example constitutes a practical embodiment of my invention, I do not limit myself to the exact details shown, since modification of the same may be varied without departing from the spirit of this invention.

Having described the invention, I claim:

1. Checking apparatus comprising, condition responsive means; condition circuit means operative to produce a condition voltage varying in phase and magnitude in response to varying conditions being measured by said condition responsive means; a comparing circuit producing a plurality of reference voltages adapted to receive said condition voltage and compare the magnitude and phase of said condition voltage to the magnitude and phase of each of said reference voltages; a plurality of output means; each output means being connected to receive a resultant voltage from a comparison of one of said reference voltages and said condition voltage; each output means being adapted to produce an output signal in response to a change in phase of said resultant voltage.

2. Checking apparatus as defined in claim 1 in which said condition circuit means comprises a differential transformer having a core movable in response to the condition being measured.

3. Checking apparatus as defined in claim 1 in which said comparing circuit comprises a transformer having a center-tapped secondary winding connected to a voltage dividing network to provide said plurality of reference voltages.

4. Checking apparatus as defined in claim 1 in which each of said output circuit means comprises a phase sensitive amplifier having its output connected to a switching means.

5. Checking apparatus as defined in claim 1 further characterized in that readout means are provided comprising indicating means responsive to a matrix of switching means connected to receive the output signals of said output means.

6. Checking apparatus as defined by claim 2 in which said comparing circuit comprises a second transformer having a center-tapped secondary winding connected to a voltage dividing network to provide said plurality of reference voltages; said condition voltage from said condition circuit being connected to said center tap enabling the comparison of said condition voltage and said reference voltage.

References Cited in the file of this patent
UNITED STATES PATENTS

| | | |
|---|---|---|
| 2,306,789 | McNamara | Dec. 29, 1942 |
| 2,601,786 | Best | July 1, 1952 |
| 2,610,052 | Macgeorge | Sept. 9, 1952 |
| 2,688,459 | Merrill | Sept. 7, 1954 |
| 2,693,336 | Johnson | Nov. 2, 1954 |
| 2,710,690 | Van Steyn | June 14, 1955 |
| 2,790,549 | Bize | Apr. 30, 1957 |
| 2,918,246 | Bell | Dec. 22, 1959 |